US006734904B1

United States Patent
Boon et al.

(10) Patent No.: US 6,734,904 B1
(45) Date of Patent: May 11, 2004

(54) IMAGING SYSTEM AND METHOD WITH DYNAMIC BRIGHTNESS CONTROL

(75) Inventors: Cathy L. Boon, Orange, CA (US); Steffi Mehring, Braunsbach (DE)

(73) Assignees: Iteris, Inc., Anaheim, CA (US); Daimler-Benz AG, Stuttgart (DE)

( * ) Notice: Subject to any disclaimer, the term of this patent is extended or adjusted under 35 U.S.C. 154(b) by 0 days.

(21) Appl. No.: 09/121,800

(22) Filed: Jul. 23, 1998

(51) Int. Cl.[7] .............................. H04N 9/58; H04N 7/18
(52) U.S. Cl. ........................................ 348/234; 348/149
(58) Field of Search ................................. 348/223, 234, 348/295, 362, 363, 364, 352, 223.1, 149, 148; 340/937, 933, 935, 936; 382/274

(56) References Cited

U.S. PATENT DOCUMENTS

| | | | | |
|---|---|---|---|---|
| 5,210,566 A | * | 5/1993 | Nishida ....................... 348/352 |
| 5,282,022 A | * | 1/1994 | Haruki et al. ................ 348/223 |
| 5,343,246 A | * | 8/1994 | Arai et al. ................... 348/363 |
| 5,351,044 A | | 9/1994 | Mathur et al. |
| 5,426,685 A | | 6/1995 | Pellegrino et al. |
| 5,499,040 A | | 3/1996 | McLaughlin et al. |
| 5,521,615 A | | 5/1996 | Boyan |
| 5,528,698 A | | 6/1996 | Kamei et al. |
| 5,550,556 A | | 8/1996 | Wu et al. |
| 5,570,108 A | | 10/1996 | McLaughlin et al. |
| 5,579,049 A | * | 11/1996 | Shimaya et al. ............. 348/364 |
| 5,617,462 A | | 4/1997 | Spratt |
| 5,784,102 A | * | 7/1998 | Hussey et al. ............... 348/296 |
| 5,954,653 A | * | 9/1999 | Hatfield et al. .............. 382/274 |
| 5,966,175 A | * | 10/1999 | Inoue .......................... 348/364 |
| 6,411,328 B1 | * | 6/2002 | Franke et al. ................ 348/149 |

OTHER PUBLICATIONS

Patent Abstracts of Japan, vol. 016, No. 205 (P–1353), May 15, 1992, & JP 04 034594 Feb. 5, 1992.
Patent Abstracts of Japan, vol. 1997, No. 08, Aug. 29, 1997, & JP 09102930 (Apr. 15, 1997).
Patent Abstracts of Japan, vol. 015, No. 476 (E–1140), Dec. 4, 1991 & JP 03204281 (Sep. 5, 1991).
Summary of German Instruction Manual for the COBRA ANCIS 110 camera, published Oct. 17, 1994 by COBRA Electronic GmbH.

* cited by examiner

*Primary Examiner*—Andrew Christensen
*Assistant Examiner*—Luong Nguyen
(74) *Attorney, Agent, or Firm*—Myers Dawes Andras & Sherman, LLP

(57) ABSTRACT

An imaging system with brightness control includes an image capture subsystem and an image control block and is adapted for use in conjunction with an image processing application. The image capture subsystem receives an image and converts this image into digital image data. The digital signal is then stored in a video buffer for access by the image control block. The image control block provides brightness control of an image sensor in the image control subsystem to optimize the brightness of the desired area of interest in the image relative to the background. In one application, the imaging system is used in conjunction with a lane tracking system image processing application to detect roadway lane markings from a moving vehicle.

13 Claims, 3 Drawing Sheets

IMAGING SYSTEM AND METHOD WITH DYNAMIC BRIGHTNESS CONTROL

FIELD OF THE INVENTION

The present invention relates to systems and methods which provide brightness control processing for images received from an image sensor. More particularly, the present invention relates to imaging systems for optical vehicle safety systems or driver assistance systems.

BACKGROUND OF THE INVENTION

Electronic imaging systems have long been used to provide images in various applications. One of the primary problems that imaging systems must overcome relates to variable scene brightness within the imager field-of-view. Because the brightness level in a scene to be imaged can often change dramatically, the image sensor must adjust the exposure/gain levels to compensate for the changing brightness level. Slow but very significant variations will obviously occur between day and night operation but more rapid variations may also occur. For example, one application of image sensing systems is in the field of vehicle safety or navigation systems. More particularly, image sensing systems can be used to monitor a vehicle's progress in a desired lane of traffic, and to issue a warning to the driver of the vehicle if it is unintentionally exiting the designated lane. In such applications, extreme and rapid brightness changes in the scene may be experienced due to tunnel exits, irregular shadows on the road, etc., along with the slower variations in brightness due to time of day and weather conditions.

Typically, one of the problems encountered due to brightness variation in the scene to be imaged is that the image sensor only has a certain dynamic range. Without control over image sensor exposure/gain, extreme brightness will thus easily saturate the image sensor while an extremely dark scene will fall below the minimum detectable light level. Therefore, one goal of the system must be to continually modify the exposure/gain settings of the image sensor in accordance with the changing brightness level in the scene.

Typically, the maximum dynamic range of an imaging system is obtained by varying the exposure/gain of the image sensor in the system. Such image sensor based systems are increasingly single chip VLSI devices. Therefore, in one approach to exposure/gain control, the imager chip manufacturer permanently encodes an exposure/gain control algorithm on the chip. In such an approach, the on chip algorithm first counts all pixels in the image which have an intensity greater than a set threshold level of brightness. Based on this count, the on chip algorithm decides whether to increase or decrease the amount of exposure/gain for the sensor. The on chip algorithm may alter the exposure/gain value by either large or small increments, depending on the relative difference between the bright pixel count and the threshold values.

One example of such a prior art imaging chip with on chip brightness compensation is the VV5430 Monolithic Sensor which is manufactured by VLSI Vision, Ltd. in the United Kingdom. This chip counts all pixels in the image which have an intensity greater than a certain Very White Pixel threshold. This prior art approach then changes the exposure and gain settings based on a comparison of this count to fixed brightness thresholds.

In this prior art approach, the exposure/gain is optimized for an entire field-of-view. However, some applications can require optimization only in small region(s) of interest in a scene. If the overall scene brightness is much different from the brightness in the region(s) of interest, the above-described dynamic exposure/gain control method can actually degrade the brightness and contrast in the region(s) of interest in an image.

Another aspect of this prior art approach is that it employs one fixed set of brightness thresholds. These thresholds are chosen to provide images acceptable for most applications in most lighting conditions, but may provide poor quality images in extreme lighting conditions, such as glare, shadows, or overall dark or bright extremes of light. Some applications require images with optimal brightness and contrast even in these extreme conditions, in which case, the above-described method is not adequate.

Also, this prior art approach is designed to adjust for changes in brightness somewhat gradually. In an environment where brightness may be rapidly changing, such adjustments allow for many image frames which are somewhat overexposed or underexposed. For example, glare or shadows moving through a scene may suddenly change the brightness of a portion of the scene very significantly. If the image system is being used in a computer system application where such glare or shadow effect is a factor, the image frames with less than optimal brightness and contrast may need to be either disregarded or processed further using algorithms for correcting severely degraded image quality which can significantly reduce system performance.

Therefore, a need presently exists for a method which provides dynamic brightness control of an image sensor and addresses the problems noted above.

SUMMARY OF THE INVENTION

The present invention provides an imaging system and method for brightness control of an image sensor which optimizes the dynamic range of the sensor for one or more regions of interest within the imager field-of-view.

The present invention further provides an imaging system and method for brightness control of an image sensor which optimizes exposure/gain of the sensor for a wide range of lighting conditions including very dark or very bright.

The present invention further provides an imaging system and method for brightness control of an image sensor which adapts quickly to changing light conditions.

In a preferred embodiment, the present invention provides a method of brightness control of an image sensor based on image data received from the image sensor. One or more object(s) of interest within the image are identified and the brightness level of one or more region(s) in the image is detected, said region(s) comprising the background surrounding said object(s) of interest. An adjusted brightness level of the image is determined such that the brightness of the object(s) of interest will be optimized in relation to the background region(s) surrounding said object(s) of interest. The image sensor settings are controlled to alter the brightness level in the image region(s) to the adjusted brightness level to enhance imaging of the object(s) of interest. In another aspect, the present invention includes an imaging system having an image sensor for providing image data of a scene. An image control block includes means for identifying one or more object(s) of interest in said image and means for detecting the brightness level of one or more region(s) in the image, said region(s) comprising the background surrounding said object(s) of interest. The image control block also includes means for determining an adjusted brightness level of the image, such that the brightness of said object(s) of interest is optimized in relation to the background region(s) surrounding said object(s) of interest. The image control block also includes control means coupled to the image sensor, for controlling the image sensor to alter the brightness level of the image to the adjusted brightness level to enhance imaging of the object(s) of interest in the scene.

A more complete understanding of the method and apparatus for an image sensor brightness control will be afforded to those skilled in the art, as well as a realization of additional advantages and objects thereof, by a consideration of the following detailed description of the preferred embodiments. Reference will be made to the appended sheets of drawings which will first be described briefly.

DETAILED DESCRIPTION OF THE PREFERRED EMBODIMENTS

The present invention provides an imaging system and related method for brightness control of an image sensor. A preferred application is in an optical lane departure warning system, but the invention is not so limited. In the detailed description that follows, like element numerals are used to describe like elements illustrated in one or more of the above-mentioned figures.

Figure 1:
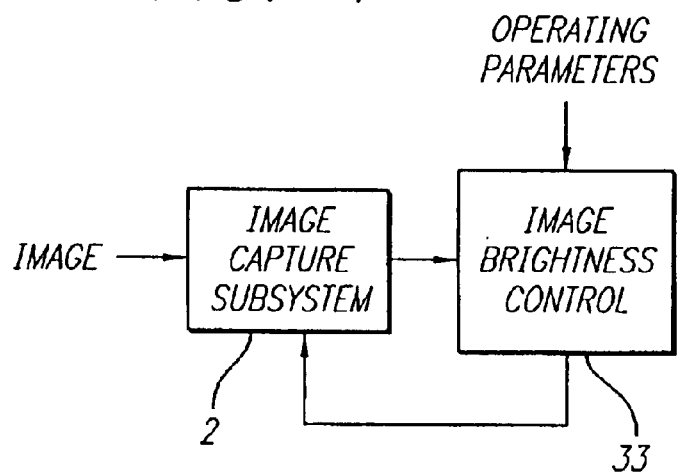
FIG. 1 is a block diagram of the image brightness control method according to one embodiment of the present invention.

Referring first to FIG. 1, a high-level block diagram of the imaging system is depicted according to one embodiment of the present invention. Image capture subsystem 2 detects light within a scene and provides image data. Image brightness control block 33 operates on said image data using parameters which describe the location(s) and characteristics of one or more regions and objects of interest within a scene. Image brightness control block 33 can control an imager in the image capture subsystem 2 to optimize the brightness and contrast of the desired object(s) of interest within the scene relative to the scene background for the next frame or frames of image data. Image brightness control block 33 includes, in one embodiment, a software implemented control that adjusts various threshold values employed by said imager for exposure/gain setting adjustment. This control is illustrated by the feedback loop in FIG. 1.

Figure 2:
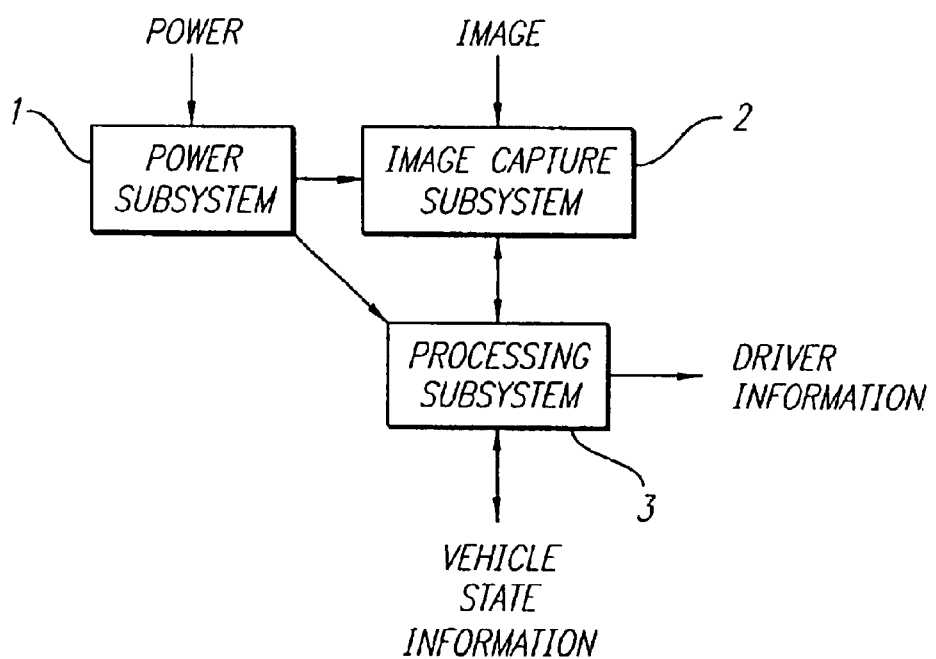
FIG. 2 is a block diagram of the overall architecture of an optical lane departure warning system which includes the image brightness control system and method according to one embodiment of the present invention.

To provide a specific environment for discussion of the present invention, one application which will be described is a system which detects when a vehicle drifts out of a traffic lane and provides a warning to the driver of the vehicle. A block diagram of the overall architecture of a lane departure warning system is depicted in FIG. 2 according to one embodiment of the present invention.

Power for the system is input into power subsystem 1. Image capture subsystem 2 receives and detects incoming scene information to create image signals and stores the image data in a buffer for use by processing subsystem 3. Processing subsystem 3 contains the microprocessor, memory, and software for analysis of the image data to determine the vehicle position relative to the traffic lane and for the image brightness control processing. Processing subsystem 3 receives status information from the vehicle and provides information to the vehicle and the driver concerning the warning system status. Processing subsystem 3 also provides information to image capture subsystem 2 to control the capture of succeeding images.

Figure 3:
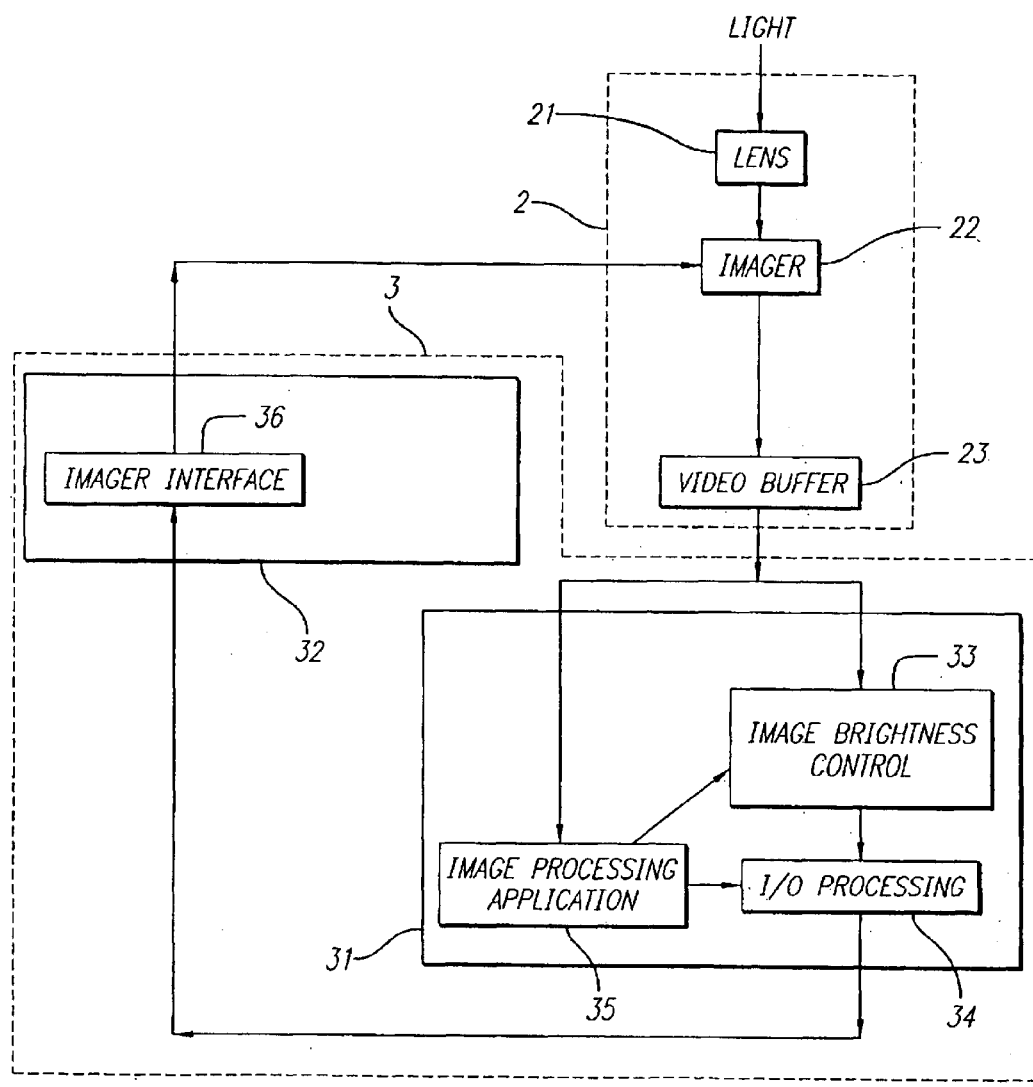
FIGS. 3 and 4 are block diagrams illustrating the image brightness control system and method according to one embodiment of the present invention.

Referring to FIG. 3, image capture subsystem 2 and processing subsystem 3 are shown in more detail in one preferred embodiment of the present invention. Image capture subsystem 2 preferably includes a lens 21, an imager 22, and a video buffer 23. Imager 22 receives the input image focused by lens 21. Imager 22 comprises an imaging device such as a CMOS device or a charge-coupled device (CCD). Such devices are commercially available and in a preferred embodiment, imager 22 may be a single chip imager such as a W5430 Monolithic Sensor manufactured by VLSI Vision Ltd. Imager 22 sends a signal representing the input image to be stored in video buffer 23 where it may be accessed by processing subsystem 3.

Also as shown in FIG. 3, processing subsystem 3 includes, in one embodiment, a digital signal processor (DSP) 31 and a field programmable gate array (FPGA) 32. DSP 31 preferably implements software including image brightness control block 33, an input/output (I/O) processing block 34, and an image processing application block 35. As noted above, a lane tracking application is merely one example of an application of the present invention. FPGA 32 preferably implements the feedback loop between DSP 31 and imager 22.

Image brightness control block 33 is, in one embodiment of the present invention, implemented in software and operates to determine the brightness of the background of the region(s) of interest in the scene from the image data provided by image capture subsystem 2 and to dynamically control imager 22 to optimize said brightness. More particularly, image brightness control block 33 adjusts various threshold values employed by imager 22 for exposure/gain setting adjustment to optimize the brightness of the desired object(s) of interest relative to the background region(s) in the image including compensating for specific light conditions, such as extreme light or darkness.

For example, when the region(s) of interest is(are) dark compared to the overall image or when the lighting condition is extremely dark, the thresholds are increased, resulting in the overall image becoming more bright while the region(s) of interest has(have) improved brightness and contrast. Similarly, when the region(s) of interest is(are) bright compared to the overall image or when the lighting condition is extremely bright, the thresholds are decreased, resulting in the overall image becoming more dark while the region(s) of interest has(have) improved brightness and contrast. In addition, the threshold values are set so that the exposure/gain can be quickly adapted to changes in lighting conditions. This also results in greater consistency and predictability of image brightness which allow the brightness control method to perform more effectively.

Figure 4:
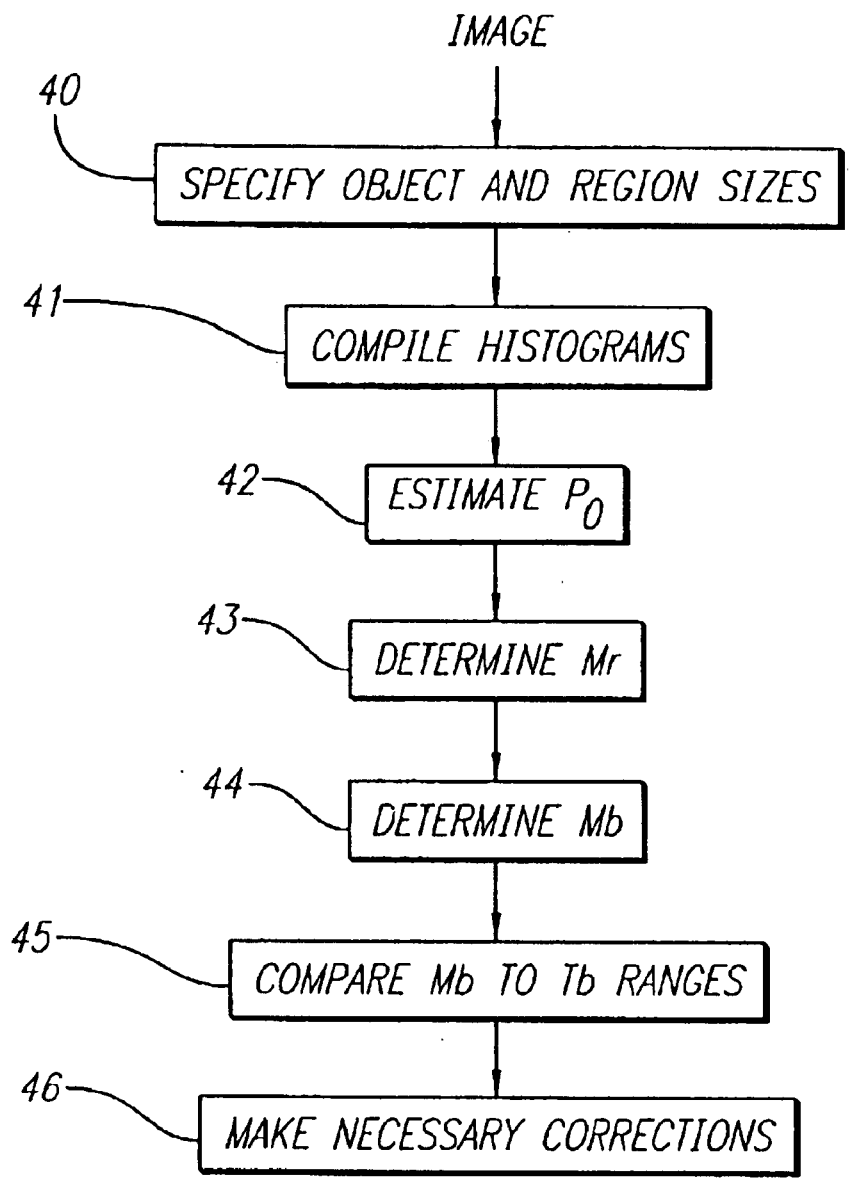

The steps as implemented by image brightness control block 33 are shown in more detail in the flow chart of FIG. 4. In operation, the image brightness control block 33 investigates one or more region(s) in the image which contain one or more objects of interest, said region(s) comprising the background surrounding said object(s) of interest. This investigation may optionally include information provided by the image processing application block 35 (as shown in FIG. 3). In one application of the present invention, the object(s) of interest can be roadway lane marker(s).

The image brightness control block 33 seeks to maintain the maximum background level in the region(s) of interest in the image at a threshold, Tb, within a range,+/−Tw. At block 41, a histogram of pixel intensities in each region of interest is compiled. As depicted at block 42, the number and intensity of image pixels comprising the object(s) of interest, Po, is estimated using knowledge about the objects(s) of interest. The Po object pixels in the histogram are then disregarded. At block 43, the maximum value within the remaining histogram is considered to be the maximum background intensity within each region, Mr. At block 44, the overall background maximum, Mb, is determined by identifying the maximum of all of the Mr. At block 45, the algorithm determines whether Mb is either within Tb+/−Tw or Tb+/−(3*Tw), makes any necessary adjustments to the exposure/gain control thresholds at block 46, and returns the adjusted threshold values to image capture subsystem 2 via a feedback loop as shown.

More specifically, if Mb is within Tb+/−Tw, then the exposure/gain is considered "good", and the threshold values are not changed. If Mb is outside this ideal range, but still within Tb+/−(3*Tw), the exposure/gain is considered "fair", and the threshold values are changed by an amount proportional to (Tb−Mb). Finally, if Mb is outside the "fair" range, the exposure/gain is considered "poor", and the threshold values are adjusted by a maximum amount. In either case, the threshold values are increased when Mb< Tb and decreased when Mb> Tb.

Whenever the threshold values are changed, a certain number of image frames are required to allow the imager 22 to adjust the exposure/gain based on the new threshold values. Therefore, a programmable frame delay is incorporated into the image brightness control loop so that the method described above is performed on every nth image frame. Without this delay, possible overcorrection and rebound can occur yielding images which cycle from overexposed to underexposed and back again.

Lane tracking application block 35 also receives the image data from image capture subsystem 2 and attempts to identify and track roadway lane markings.

As shown in FIG. 3, the brightness control block 33 and lane tracking application block 35 transmit their respective data to the input/output (I/O) processing block 34. The I/O processing block 34 then transmits this information through a feedback loop, which includes in one embodiment interface block 36 in the FPGA 32 back to imager 22 in the image capture subsystem 2.

As noted above, although the lane tracking application block 35 implements a preferred example of the present invention, the present invention is not so limited. Suitable modifications may be made in the dynamic brightness control block 33 described above to accommodate such other applications.

Having thus described a preferred embodiment of an image sensing system and method having dynamic brightness control, it should be apparent to those skilled in the art that certain advantages of the within system have been achieved. It should also be appreciated that various modifications, adaptations, and alternative embodiments thereof may be made within the scope and spirit of the present invention. The invention is further defined by the following claims.

What is claimed is:

1. A method of brightness control for an image sensor, said method comprising:

receiving image data of an image from said image sensor;
   determining pixel intensities in a region of interest comprising a portion of the image including roadway lane marker(s);
   estimating the number and intensity of pixels corresponding to the lane marker(s) in said region of interest based on prior knowledge of the lane marker(s);
   discarding the pixels corresponding to the lane marker(s) to derive pixels comprising the background portion of the region of interest surrounding the lane marker(s);
   detecting the brightness level of said pixels comprising the background portion of the region of interest;
   determining an adjusted brightness level of said background portion of the region of interest, wherein the brightness of said lane marker(s) is optimized in relation to said background portion of the region of interest; and
   controlling said image sensor to alter said brightness level of said background portion of the region of interest to said adjusted brightness level.

2. A method as set out in claim 1, wherein said portion of the image corresponds to the background.

3. A method as set in claim 1, wherein said image sensor comprises an imaging chip having exposure/gain settings and wherein said controlling alters said exposure/gain settings.

4. A method as set out in claim 1, wherein said image sensor comprises an imaging chip having exposure/gain settings and having an on chip/exposure gain control algorithm wherein said controlling alters parameters used by said on chip exposure/gain control algorithm to effect alteration of said exposure/gain settings.

5. An imaging system with dynamic brightness control, said system comprising:

an image sensor for providing image data of a scene;
   means for automatically determining pixel intensities in a region of interest comprising a portion of the image including roadway lane marker(s);
   means for automatically estimating the number and intensity of pixels corresponding to the lane marker(s) from said pixel intensities in the region of interest based on prior knowledge of the lane marker(s);
   means for discarding the pixels corresponding to the lane marker(s) to derive pixels comprising the background portion of the region of interest surrounding the lane marker(s);means for detecting a brightness level of said pixels comprising the background portion of the region of interest surrounding the lane marker(s);
   means for determining an adjusted brightness level of said background portion of the region of interest surrounding the lane marker(s), wherein the brightness of said lane markers is optimized in relation to said background portion of the region of interest surrounding the lane marker(s); and
   control means, coupled to the image sensor, for controlling the image sensor to alter said brightness level of said background portion of the region of interest surrounding the lane marker(s) to said adjusted brightness level.

6. The imaging system as set out in claim 5, wherein said image sensor comprises an imaging chip for detecting an image and providing image signals.

7. The imaging system as set out in claim 5, wherein the imaging chip includes adjustable exposure/gain settings and wherein the control means adjusts the exposure/gain settings of the imaging chip.

8. The imaging system as set out in claim 6, wherein the imaging chip includes adjustable exposure/gain settings and wherein the imaging chip further includes an on chip exposure/gain control algorithm and wherein the control means adjusts the parameter used by said on chip exposure/gain control algorithm to effect alteration of the exposure/gain settings of the imaging chip.

9. The imaging system as set out in claim 6, wherein said imaging sensor further includes a video buffer for storing digital image data.

10. The imaging system as set out in claim 5, wherein said portion of the image comprises the background portion surrounding the object(s) of interest and wherein said adjusted brightness level is chosen to maintain the brightness level of said background at or below a desired threshold.

11. The imaging system as set out in claim 7, wherein the control means dynamically controls the imaging chip settings on a frame by frame basis.

12. The imaging system as set out in claim 8, wherein the control means dynamically controls the imaging chip settings on a frame by frame basis.

13. The imaging system as set out in claim 5, wherein the means for detecting only examines the image data corresponding to a portion of the image data having a brightness level below a threshold value.

* * * * *